Aug. 18, 1970     J. R. ELMORE     3,524,237
CAGE WITH SEALS FOR BEARINGS AND MANUFACTURE THEREOF
Filed Feb. 26, 1968     2 Sheets-Sheet 1
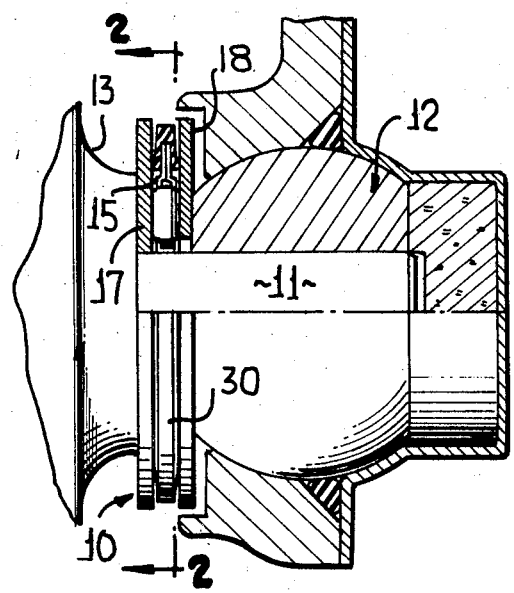
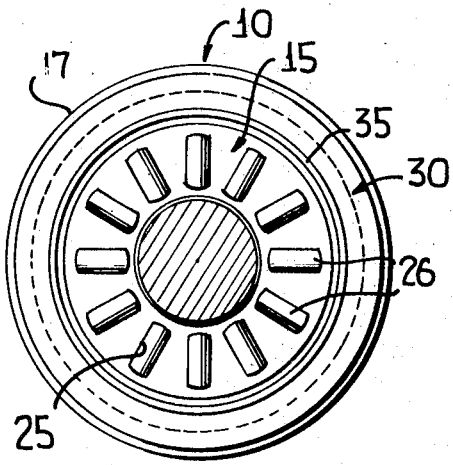
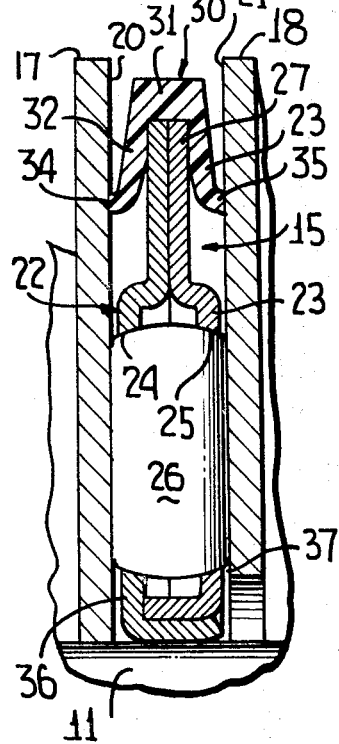
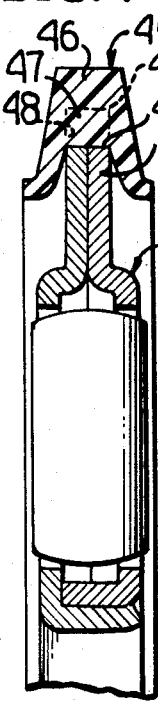
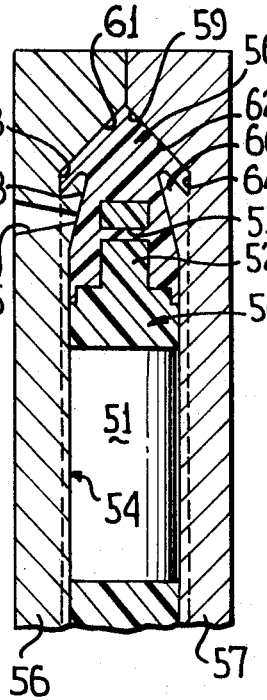
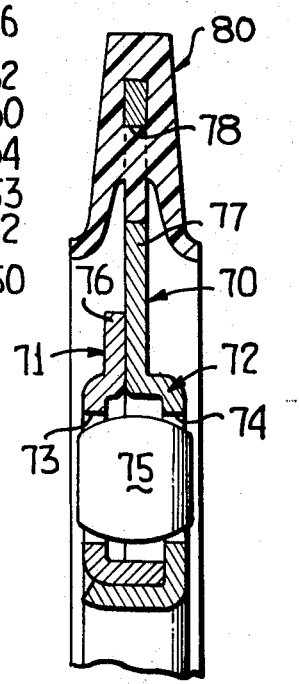
INVENTOR
J. RUSSELL ELMORE
BY
Mason, Porter, Diller & Brown
ATTORNEYS Aug. 18, 1970   J. R. ELMORE   3,524,237
CAGE WITH SEALS FOR BEARINGS AND MANUFACTURE THEREOF
Filed Feb. 26, 1968   2 Sheets-Sheet 2

INVENTOR
J. RUSSELL ELMORE
BY
Mason, Porter, Diller & Brown
ATTORNEYS

United States Patent Office 3,524,237
Patented Aug. 18, 1970

3,524,237
**CAGE WITH SEALS FOR BEARINGS
AND MANUFACTURE THEREOF**
J. Russell Elmore, New Hartford, Conn., assignor to
The Torrington Company, Torrington, Conn., a corporation of Maine
Filed Feb. 26, 1968, Ser. No. 708,026
Int. Cl. B21d 53/12
U.S. Cl. 29—148.4     32 Claims

ABSTRACT OF THE DISCLOSURE

This disclosure is directed to a novel axial thrust bearing cage defined by an annular structure having a plurality of pockets extending axially therethrough for receiving anti-friction members and with annular sealing means situated upon the radially outermost peripheral portion of the annular structure and interlocked therewith. In the preferred novel method of manufacture, the annular sealing means are formed in situ upon the outermost peripheral portion of the cage and interlocked therewith in a single molding operation.

---

It is a primary object of this invention to provide a novel cage for rolling bearing elements which cage includes annular circumferential sealing lips which cooperate with laterally adjacent surfaces for retaining a lubricant in confined relationship about the rolling elements, and the sealing element being formed in situ upon an outer peripheral portion of the cage and in interlocked relationship therewith.

A further object of this invention is to provide a novel cage for rolling bearing elements which cage includes annular circumferential sealing lips similar to the aforesaid, said sealing lips being formed separately and assembled upon the outer peripheral portion of the cage through chemical bonding.

A further object of this invention is to provide a cage with annular sealing lips similar to the aforesaid, said sealing lips being formed separately and assembled upon the outer peripheral portion of the cage through a mechanical interlock.

It is another object of this invention to provide a cage for rolling bearing elements of the type set forth wherein the outer peripheral portion of the cage is provided with a plurality of circumferentially disposed axial apertures or radially outwardly opening recesses which receive a portion of the elastomeric material from which the sealing lips are molded to form an interlock between the sealing lips and the cage.

Still another object of this invention is the provision of a novel method of manufacturing a seal structure particularly adapted for use as a bearing cage by first forming an annular structure having recess means along an outermost peripheral portion thereof, housing the peripheral portion in an annular mold chamber which includes at least one annular channel opening toward a plane normal to the axis of the annular structure, injecting elastomeric material into the annular mold chamber filling the latter and the recess means, setting the elastomeric material whereby the portion thereof within the recess means maintains the annular mass of elastomeric material and the annular structure in assembled relationship, and withdrawing the assembled seal structure from the mold chamber.

A further object of this invention is to provide a novel method including the steps aforesaid, but chemically bonding the elastomeric material to the peripheral portion of the cage instead of, or in conjunction with, injecting the material into recess means to maintain the annular mass of elastomeric material and the annular cage in assembled relationship.

A further object of this invention is to provide a novel method including each of the steps aforesaid as well as either forming pockets in the annular cage structure inboard of the recess means prior to housing the peripheral portion in the annular mold chamber, or both forming pockets in the annular structure and positioning anti-friction elements in the pockets prior to housing the peripheral portion in the annular mold chamber.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a fragmentary longitudinal sectional view with portions shown in elevation of a shaft assembly embodying an axial thrust bearing assembly, and illustrates a novel cage having rolling bearing elements received therein in contacting engagement with adjacent thrust washer surfaces, and annular sealing lips in sealing engagement with adjacent thrust washer surfaces.

FIG. 2 is a sectional view taken generally along line 2—2 of FIG. 1, and more clearly illustrates the annular configuration of one of the sealing lips and its position radially outboard of a plurality of cage pockets.

FIG. 3 is a highly enlarged fragmentary cross-sectional view of the uppermost portion of the bearing assembly of FIG. 1, and more clearly illustrates the manner in which the sealing lips are in sealing contact with the thrust washer surfaces.

FIG. 4 is a fragmentary sectional view taken through the axis of another cage, and illustrates annular sealing means interlockingly secured to an outermost peripheral portion of the cage.

FIG. 5 is a fragmentary sectional view taken through the axis of another cage constructed in accordance with this invention, and illustrates the manner in which annular sealing means is simultaneously formed upon and interlocked with the cage during an injection molding operation.

FIG. 6 is an enlarged fragmentary sectional view taken along the axis of another cage constructed in accordance with this invention, and illustrates an annular sealing member interlockingly secured to an outermost peripheral portion of a two-piece cage.

Figure 10:
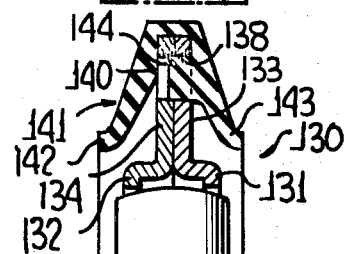

FIG. 10 is a fragmentary sectional view taken along the axis of another cage constructed in accordance with this invention, and illustrates an annular sealing member molded separately and subsequently interlockingly secured to the outermost peripheral portion of a two-piece cage by short axially directed lugs on the sealing means which are engaged in recesses of the peripheral portions of the cage.

Figure 11:
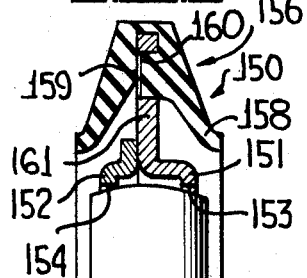

FIG. 11 is an enlarged fragmentary sectional view taken along the axis of another cage constructed in accordance with this invention, and illustrates another annular sealing member molded separately and subsequently interlockingly secured to the outermost portion of one of a pair of cage halves by short lugs on the sealing means which are engaged in the recesses of the peripheral portion of the larger cage half.

Figure 12:
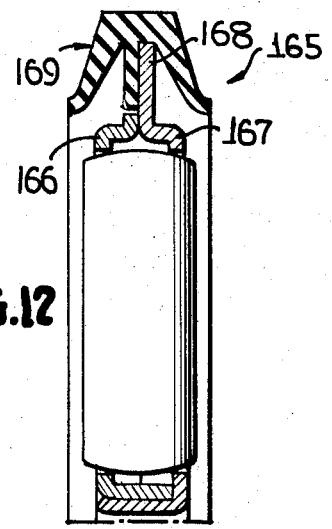

FIG. 12 is a fragmentary sectional view taken along the axis of another cage constructed in accordance with this invention, and illustrates an annular sealing member chemically bonded to an outermost peripheral portion of the cage.

Figure 13:
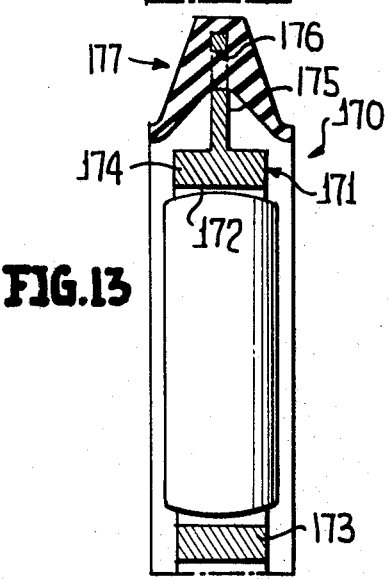

FIG. 13 is a fragmentary sectional view taken along the axis of another cage constructed in accordance with this invention, and illustrates a cage of a heavy section one-piece construction.

Figure 14:
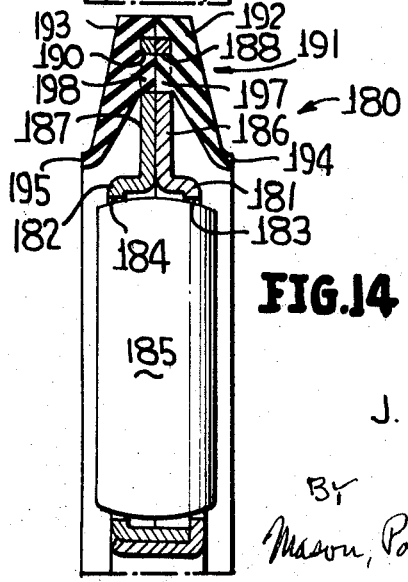

FIG. 14 is a fragmentary sectional view taken along the axis of another cage constructed in accordance with this invention, and illustrates a cage wherein each half has an annular half-seal formed upon it, which halves are subsequently assembled together to form the complete annular cage and the annular sealing means thereof.

Referring now to the drawings in detail, reference is first made to FIG. 1 of the drawings wherein there is illustrated an axial thrust bearing assembly 10 positioned about a shaft 11 between a self-aligning radial bearing 12 and a machine element 13 which applies axial thrust through the bearing assembly 10 of this invention.

The bearing assembly 10 includes a cage or retainer, generally designated by the reference numeral 15, which is housed between thrust washers 17, 18 having respective surfaces or races 20, 21.

The cage 15 is of a two-piece metallic construction, and includes a pair of annular cage halves or elements 22, 23 in each of which are formed a plurality of axially opening pockets or windows 24, 25 for receiving anti-friction members or bearing elements 26 in the manner clearly illustrated in FIGS. 2 and 3 of the drawings. The cage 15 is of a conventional annular configuration, as is best illustrated in FIG. 2, and a peripheral edge portion 27 thereof which is radially outboard of the pockets 24, 25 and the bearing elements 26 is provided with annular sealing means 30.

The annular sealing means 30 is generally of an inverted U-shaped configuration as viewed in FIG. 3 of the drawings, and includes a relatively thick circumferentially extending bight portion 31 and a pair of radially inwardly directed annular flanges 32, 33 terminating in respective oppositely axially directed sealing lips 34, 35. The terminal surfaces (unnumbered) of the sealing lips 34, 35 are in sealing engagement with respective races 20, 21 and function to retain or confine lubricant in the area inboard of the flanges 32, 33 and between the washers 17, 18.

Prior to being mounted upon the shaft 11 in the manner best illustrated in FIG. 3 of the drawings, the lips 34, 35 project axially beyond opposite generally parallel surfaces 36, 37 of the cage 15. However, when the surfaces 20, 21 of the washer 17, 18, respectively, are brought into contacting engagement with the rolling elements 26 the annular sealing lips 34, 35 and the flanges 32, 33 thereof are axially depressed toward each other an amount sufficient such that their inherent resiliency will enable sufficient contact pressure to be effected between the sealing lips 34, 35 and the surfaces 20, 21 to retain the lubricant spaced radially inwardly of the sealing means 30 during the relative sliding engagement of the washers 17, 18 and the cage 15. In order to assure that the sealing means 30 is of a sufficient resilience to function in the manner aforesaid, the sealing means 30 is preferably constructed from elastomeric material such as polymeric or copolymeric plastic material, such as polyethylene or the like, or rubber or other rubber-like material, and is either first formed and united with the cage 15 by simply temporarily stretching the sealing means and allowing it to reform around the cage or, in a preferred embodiment of the invention to be described hereafter, the sealing means 30 or similar analogous sealing means is molded in situ directly upon the peripheral portion 27, as will be described more fully hereafter. If desired, the sealing means 30 or other sealing means to be described hereafter, whether molded in situ upon the cage or molded separately and then assembled to the cage, may be chemically bonded to the cage in ways which are well known in the art.

Reference is now made to FIG. 4 of the drawings which illustrates another cage 40 of this invention, constructed similar to the cage 15, but differing in that an outermost peripheral portion 41 thereof is provided with a plurality of circumferentially spaced radially outwardly opening recess means or slots 42, only one of which is illustrated, between adjacent pairs of which is a radially outwardly directed tongue 43. Another sealing means 45 which is similar in construction to the sealing means 30 is secured to the peripheral portion 41 of the cage 40. However, in this case the sealing means 45 includes a bight portion 46 having a plurality of radially inwardly directed lugs or tongues 47, each of which is interlockingly engaged within an associated one of the slots 42 of the cage 40. Likewise, radially inwardly opening recesses or slots 48 of the sealing means 45 receive an associated one of the radially outwardly directed tongues 43 of the cage 40. In this manner the cage 40 is mechanically interlockingly secured to the annular sealing means 45 by the interlocking engagement between the components 42, 43, 47 and 48. The annular sealing means 45 is preferably in situ molded upon the peripheral portion 41 of the cage 40 in a manner to be described immediately hereafter. However, if desired the annular sealing means 45 may be molded first and thereafter simply stretched to encompass the peripheral portion 41 whereupon the natural resilience and rebound characteristics of the sealing means 45 assures the mechanical interlock of the latter with the cage 40.

Referring to FIG. 5 of the drawings, another cage 50 of a one-piece plastic construction is shown seated within a mold chamber 54 defined by a pair of mold bodies 56, 57 of a split mold. The cage 50 is preferably injection molded from nylon or similar material and is provided with pockets or windows 51 and a plurality of axially opening apertures or recess means 53 in a flange 52. The apertures 53 are preferably equally circumferentially spaced about the flange or peripheral portion 52.

Annular sealing means 55 is molded in situ upon the peripheral portion 52 of the cage 50 by injecting molten flowable plastic material into an annular chamber, generally designated by the reference numeral 59. The annular chamber 59 includes a pair of annular lip-forming chambers 63, 64 each defined by respective annular radially outwardly directed ribs 58, 60 and adjacent annular inclined surfaces 61, 62. The mold body 56 is stationary while the mold body 57 is carried by a movable platen of a conventional injection molding machine (not shown). The mold body 56 further includes a sprue 65 or a plurality of sprues opening through the mold body 56 into the annular chamber 59.

After the cage 50 has been positioned as shown in FIG. 5 with the mold bodies 56, 57 closed, elastomeric material is injected into the chamber 59 through the sprue (or sprues) 65 filling the chamber 59 in the manner readily apparent in FIG. 5 of the drawings. Upon the subsequent setting-up of the material within the chamber 59 the annular sealing means 55 is completely formed and interlockingly joined to the flange 52 of the cage 50 due to the now solidified material bridging each of the apertures or openings 63. Upon the opening of the mold bodies 56, 57 the now completed cage 50 can be removed therefrom, it being noted that the annular sealing lips (unnumbered) have sufficient resilience to be withdrawn readily from the annular lip-forming chambers 63, 64.

While the formation of the annular sealing means 55 has been described in conjunction with a pocketed or windowed cage, it is to be understood that the cage 50 can be inserted in the mold chamber 54 prior to the formation of the pockets 51 therein, and after the molding operation the pockets 51 can be formed in the cage 50 and bearing elements thereafter inserted in each of the pockets. Furthermore, by appropriately contouring the cavity 54 to accommodate bearing elements the cage 50 can be inserted into the cavity 54 after the bearing elements have been inserted into the pockets 51. After the completion of the formation of the sealing means 55 the manufacturing would be completed except for trimming or finishing the sealing means 55, which at times may be necessary.

Reference is now made to FIG. 6 of the drawings which illustrates another cage 70 of a two-piece metallic construction formed by a pair of cage halves 71, 72 which are respectively apertured at 73, 74 to form pockets or windows for bearing elements 75.

The cage halves 71, 72 include respective outermost peripheral flanges or portions 76, 77, the latter of which is provided with a plurality of axial apertures or openings 78 which are preferably equally spaced about the circumference of the peripheral portion 74. When the cage 70 with the bearing elements 75 positioned therein is placed in an injection mold of the type illustrated in FIG. 5 but modified as heretofore noted annular sealing means 80 can be readily injection molded upon and secured to the peripheral portion 77 of the cage 70. In this case, the elastomeric material bridges the openings 78 and the annular sealing means 80 is effectively interlockably secured about the entire periphery of the cage 70.

Figure 7:
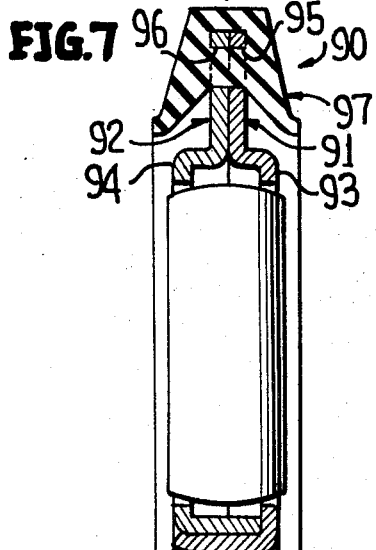
FIG. 7 is a fragmentary sectional view taken along the axis of another cage constructed in accordance with this invention, and illustrates a cage similar to the cage of FIG. 6 except that an annular sealing member is interlockingly secured to both outermost peripheral portions of a two-piece metallic cage.

Reference is now made to FIG. 7 of the drawings which illustrates another cage 90 of this invention which is similar to the cage 80 of FIG. 6, but differs therefrom in that outermost peripheral portions 91, 92 of a pair of annular cage halves or elements 93, 94, respectively, are provided with axially aligned recess means or apertures 95, 96 which are equally circumferentially spaced along the circumference of the peripheral portions 91, 92. Sealing means 97 is secured to the peripheral portions 91, 92, by being molded in situ upon the peripheral portions in the manner heretofore described relative to the sealing means 55 of the cage 80. The cage 90 is otherwise basically identical to the cage 80 of FIG. 6, and a further description thereof is believed unnecessary for a complete understanding of this invention.

Figure 8:
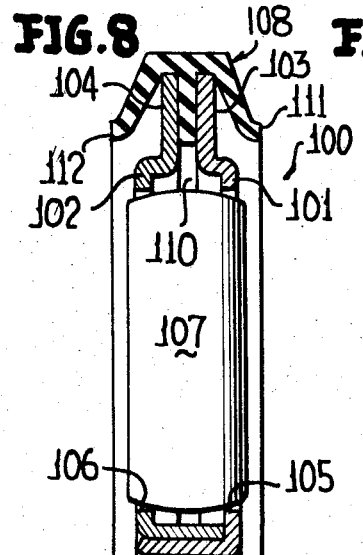
FIG. 8 is a fragmentary sectional view taken along the axis of another cage constructed in accordance with this invention, and illustrates an annular sealing member molded separately, and subsequently assembled to the cage by being clamped between the cage halves.

Another novel cage constructed in accordance with this invention is illustrated in FIG. 8 of the drawings, and is generally designated by the reference numeral 100. The cage 100 includes a pair of annular cage halves or elements 101, 102 having respective outermost peripheral portions 103, 104 and pockets 105, 106 in each of which is received bearing elements 107. Separately molded sealing means 108 in the form of an annular sealing member having a radially inwardly directed flange 110 and a pair of radially inwardly and outwardly directed sealing lips 111, 112 is carried by the peripheral portions 103, 104. In this case the sealing means 108 is, as was heretofore noted, formed separately from the cage halves 101, 102 and is clamped therebetween by means of the sandwich relationship of the flange 110 between the peripheral portions 103, 104. Conventional chemical bonding or an adhesive may be employed to maintain the sealing means 108 secured to the peripheral portions 103, 104. However, it is also to be noted that the inherent rebound characteristics of the elastomeric material from which the sealing means 108 is constructed serves as an interlock to maintain the sealing means 108 and the cage halves 101, 102 in assembled relationship solely under the influence of mechanical forces which are created as the stretched sealing means 108 attempts to return to its initial unstretched state.

It is further pointed out that while the sealing means 108 cannot be formed in situ with both of the cage halves 101, 102, it is possible by an appropriately designed mold to mold the sealing means 108 in situ upon either of the peripheral portions 103, 104 and thereafter unite the remaining cage halves and bearing elements 107. In the latter case, the peripheral portion upon which the sealing means 108 is molded in situ may be provided with circumferentially spaced recess means in the form of slots or apertures, as in the case of the cage of FIG. 11 which will be described more fully hereafter.

Figure 9:
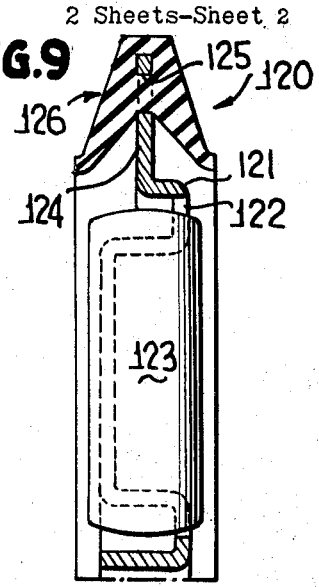
FIG. 9 is a fragmentary sectional view taken along the axis of another cage constructed in accordance with this invention, and illustrates an annular sealing member interlockingly secured to a thin section one-piece cage.

Another cage 120 illustrated in FIG. 9 of the drawings includes a single one-piece metallic cage element 121 having a plurality of circumferentially spaced pockets 122 which receive bearing elements 123 and an outermost peripheral portion 124 having a plurality of circumferentially spaced recess means or apertures 125. Annular sealing means 126 is molded in situ upon the one-piece cage element 121 in a manner heretofore described.

Another cage 130 of FIG. 10 includes a pair of metallic cage halves 131, 132 having respective outermost peripheral portions 133, 134 and pockets 135, 136 in which are appropriately housed bearing elements 137. The peripheral portions 133, 134 are provided with a plurality of axially aligned equally circumferentially spaced recess means or apertures 138, 140. Annular sealing means 141 includes a pair of sealing lips 142, 143, the latter of which includes a plurality of axially directed projections or bosses 144 equal in number and circumferential spacing to the apertures 138, 140 of the peripheral portions 133, 134, respectively. The sealing means 141 is molded separately and united with the cage halves 131, 132 by stretching the sealing means 141 about the periphery of the cage halves and thereafter the inherent elasticity of the elastomeric material from which the sealing means 141 is constructed returns the sealing means 141 to the position shown in FIG. 10 in which a projection 144 is received in each of the plurality of aligned apertures 138, 140. In this manner the cage elements 131, 132 and the sealing means 141 are maintained in mechanical interlocked relationship by the elasticity of the sealing means 141 and the interlocking of the projections 144 and the apertures 138, 140.

Another cage 150 of FIG. 11 is similar to the cage 130 of FIG. 10 in that it is constructed of a pair of annular cage halves 151, 152 having respective pockets 153, 154 in each of which is positioned a bearing element 155. As in the case of the sealing means 141 of the cage 130, the cage 150 includes sealing means 156 which is a separately molded annular member having sealing lips 157, 158, the latter of which includes a plurality of equally circumferentially spaced axially directed projections 159. The projections 159 are each interlockingly received in associated aperture 160 of an outermost peripheral portion 161 of the cage half 151.

Another cage 165 is shown in FIG. 12 and includes a pair of cage halves 166, 167, the latter of which includes an outermost peripheral portion 168. Annular sealing means 169 which is identical to the sealing means 108 of the cage 100 is secured to the peripheral portion 168. In this case, the sealing means 169 is preferably molded in situ in the manner as that described relative to the sealing means 55 of FIG. 5. However, the sealing means 169 may be molded separately and subsequently chemically or adhesively bonded to the peripheral portion 168.

Referring now to FIG. 13 of the drawings, a cage 170 is illustrated which includes a one-piece annular cage element 171 in which is formed a plurality of circumferentially spaced pockets 172. The cage element 171 has heavy-sectioned inner and outer annular walls 173, 174, the latter of which includes an outermost thinner peripheral portion 175 having a plurality of circumferentially disposed recess means or apertures 176. Sealing means 177 is molded in situ upon the outer peripheral portion 175 of the cage element 171 in the manner heretofore described relative to the cage 50 of FIG. 5.

Another cage constructed in accordance with this invention is illustrated in FIG. 14 of the drawings, and is generally designated by the reference numeral 180. The cage 180 includes a pair of cage halves 181, 182 having pockets 183, 184 in which are disposed bearing elements 185. The cage halves 181, 182 further include outermost peripheral portions 186, 187 which include respective axially aligned circumferentially disposed recess means or apertures 188, 190. Sealing means 191 are carried by the peripheral portions 186, 187, and in the instant case the annular sealing means 191 are defined by two separately molded annular sealing members 192, 193 having respective sealing lips 194, 195 and axially directed projections 197, 198. The cage 180 is manufactured by first in situ molding the annular sealing member 192 upon the cage half 181 in an appropriately designed mold chamber and again separately in situ molding the annular sealing member 193 upon the cage half 182. The bearing elements 185 and the cage halves 181, 182 are then united and are appropriately secured together in a conventional manner by, for example, disposing adhesive between the opposing contacting surfaces of the peripheral portions 186, 187 and the projections 197, 198. When so assembled the annular sealing elements 192, 193 are in effect a single one-piece seal.

As was heretofore noted, the annular sealing means of the cages illustrated in FIGS. 3, 4, 6, 7, 9, 12 and 13 are preferably formed in the same manner as that described relative to the annular sealing means 55 of the cage 50. However, the annular sealing means of the cage 180 is preferably formed in two axial halves with the two halves being subsequently assembled together, in the manner just described. However, in each case, the particular split-mold must be appropriately contoured to impart the desired cross-sectional configuration to the respective annular sealing means. Furthermore, by appropriate design of the cage pockets, the bearing elements may be installed in the cages of FIGS. 3 through 13 either before or after the in situ molding of the annular sealing means thereon. In the cage 180 of FIG. 14 the bearing elements 185 must be installed after the formation of the annular sealing members 192, 193. In FIGS. 6, 11 and 12, the annular sealing means may, of course, be applied to either of the cage halves alone before assembling the two cage halves together, or after the cage halves have been assembled together.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A cage for anti-friction members comprising an annular structure having opposite surfaces, a plurality of pockets extending axially through said annular structure and the opposite surfaces thereof, and annular sealing means projecting axially beyond one of said surfaces radially outward of said pockets for retaining a lubricant in confined relationship relative to anti-friction members adapted for positioning in said pockets.

2. The cage as defined in claim 1 wherein said annular sealing means is molded at least partially in situ upon said annular structure.

3. The cage as defined in claim 2 wherein said annular structure and said annular sealing means are constructed from non-metallic material.

4. The cage as defined in claim 2 wherein said annular structure is constructed from metallic material.

5. The cage as defined in claim 2 including means interlockingly securing said annular sealing means to an outermost peripheral portion of said annular structure.

6. The cage as defined in claim 1 wherein said annular structure includes an outermost peripheral portion, recess means in said peripheral portion, means interlockingly securing said annular sealing means to said peripheral portion, and said interlocking means being a portion of said sealing means received and retained within said recess means.

7. The cage as defined in claim 1 wherein said annular structure includes an outermost peripheral portion, a plurality of circumferentially spaced openings in said outermost peripheral portion, said annular sealing means includes a pair of annular flanges straddling said peripheral portion in overlying relationship to said openings, and means connecting said flanges to each other through said openings.

8. The cage as defined in claim 1 wherein said annular sealing means include a pair of annular sealing lips each projecting axially beyond an adjacent one of said opposite surfaces.

9. The cage as defined in claim 1 wherein said annular sealing means include a pair of annular sealing lips each projecting axially beyond an adjacent one of said opposite surfaces, and means joining said sealing lips to each other through said annular structure.

10. The cage as defined in claim 1 wherein said annular structure is constructed from a pair of annular elements, a plurality of circumferentially spaced openings in an outermost peripheral portion of at least one of said annular elements, said annular sealing means include a pair of annular sealing lips each projecting axially beyond an adjacent one of said opposite surfaces, and means joining said sealing lips to each other through said openings.

11. The cage as defined in claim 1 wherein said annular structure includes an outermost peripheral portion, a plurality of circumferentially spaced radially outwardly opening slots in said outermost peripheral portion, and said annular sealing means includes radially inwardly directed tongues receivingly interlocked with said slots for maintaining said annular structure and said annular sealing means in assembled relationship.

12. The cage as defined in claim 1 wherein said annular structure has adjacent opposed surfaces between said opposite surfaces, and a portion of said annular sealing means is sandwiched between said adjacent surfaces.

13. The cage as defined in claim 1 wherein said annular structure has adjacent opposed surfaces between said opposite surfaces, a portion of said annular sealing means is sandwiched between said adjacent surfaces, and said annular structure is defined by a pair of cage halves each of which includes one of said adjacent and opposite surfaces.

14. The cage as defined in claim 1 wherein said annular structure has adjacent opposed surfaces between said opposite surfaces, a portion of said annular sealing means is sandwiched between said adjacent surfaces, said annular structure is defined by a pair of cage halves each of which includes one of said adjacent and opposite surfaces, said annular sealing means includes a pair of annular sealing lips each projecting axially beyond an adjacent one of said opposite surfaces, and the sandwiched portion of said annular sealing means is a radially inwardly directed flange disposed between said sealing lips.

15. The cage as defined in claim 1 wherein said annular structure is of one-piece metallic element, a radial section taken through a portion of said element is of a generally U-shaped configuration, and a plurality of circumferentially disposed bearing element pockets are formed in said last-mentioned portion.

16. The cage as defined in claim 1 wherein said annular structure includes an outer peripheral portion having a plurality of axially opening recess means, and said annular sealing means include axially directed projections mechanically interlocked in said recess means.

17. The cage as defined in claim 1 wherein said annular structure includes an outer peripheral portion having a plurality of axially opening recess means, said annular sealing means include axially directed projections mechanically interlocked in said recess means, said annular structure is formed of a pair of annular cage elements, and said recess means are formed in both of said cage elements.

18. The cage as defined in claim 1 wherein said annular structure includes an outer peripheral portion having a plurality of axially opening recess means, said annular sealing means include axially directed projections mechanically interlocked in said recess means, said annular structure is formed of a pair of annular cage elements, and said recess means are formed in only one of said cage elements.

19. The cage as defined in claim 1 wherein said annular sealing means includes a radially inwardly directed flange, and said flange is bonded to a peripheral face of an outer peripheral portion of said annular structure.

20. The cage as defined in claim 1 wherein said annular sealing means is formed of two separate annular sealing members, and each sealing member includes an annular sealing lip.

21. The cage as defined in claim 20 wherein said annular structure is defined by a pair of annular cage elements, and each of said cage elements carries one of said annular sealing members.

22. A cage for anti-friction members comprising an annular structure having opposite surfaces, a plurality of pockets extending axially through said annular structure and the opposite surfaces thereof, said annular structure including a peripheral portion radially outwardly of said pockets, a plurality of recesses in said peripheral portion, annular sealing means positioned upon and about said peripheral portion, said annular sealing means including an annular sealing lip projecting axially beyond each of said opposite surfaces, and said annular sealing means further including integral means interlockingly disposed within said recesses for maintaining said annular sealing means and said annular structure in assembled relationship.

23. A method of manufacturing a seal structure particularly adapted for use as a bearing cage comprising the steps of forming an annular structure having an outermost peripheral portion, housing the peripheral portion in an annular mold chamber which includes at least one annular channel opening toward a plane normal to the axis of the annular structure, injecting elastomeric material into said annular chamber filling the latter and said recess means, setting up the elastomeric material whereby the portion thereof within the recess means maintains the annular mass of elastomeric material and the annular structure in assembled relationship, and withdrawing the now assembled seal structure from the mold chamber.

24. The method of manufacturing a seal structure as defined in claim 23 including the steps of forming pockets in the annular structure inboard of the recess means prior to housing the peripheral portion in the annular chamber, and preventing the elastomeric material from entering and closing the pockets during the injecting step.

25. The method of manufacturing a seal structure as defined in claim 23 wherein the peripheral portion includes opposite peripheral surfaces bridged by a circumferential surface, and including the further step of housing the peripheral portion in the annular chamber with the peripheral and circumferential surfaces in spaced relationship to the annular chamber whereby the elastomeric material substantially entirely covers the peripheral portion.

26. The method of manufacturing a seal structure as defined in claim 23 including the steps of forming pockets in the annular structure and positioning anti-friction members in the pockets prior to housing the peripheral portion in the annular chamber, and preventing the elastomeric material from contacting the anti-friction members and entering the pockets during the injecting step.

27. The method of manufacturing a seal structure as defined in claim 23 wherein the recess means open radially outwardly through the peripheral portion.

28. The method of manufacturing a seal structure as defined in claim 23 wherein the recess means are apertures opening axially through opposite surfaces of the peripheral portion.

29. The method of manufacturing a seal structure as defined in claim 24 including the step of forming the annular structure from non-metallic material.

30. The method of manufacturing a seal structure as defined in claim 25 wherein the recess means are apertures opening axially through opposite surfaces of the peripheral portion.

31. The method of manufacturing a seal structure as defined in claim 26 including the step of forming the annular structure from metallic material.

32. The method of manufacturing a seal structure as defined in claim 26 including the step of forming the annular structure from a pair of annular metallic elements.

References Cited

UNITED STATES PATENTS

| 2,850,792 | 9/1958 | Cobb | 29—148.4 |
|---|---|---|---|
| 3,014,768 | 12/1961 | Dickinson | 308—187.2 |
| 3,132,412 | 5/1964 | Kreissig | 264—274 X |
| 3,218,692 | 11/1965 | Kayser | 29—148.4 |

THOMAS H. EAGER, Primary Examiner

U.S. Cl. X.R.

308—187.2